(12) United States Patent
Anthony et al.

(10) Patent No.: US 12,705,091 B2
(45) Date of Patent: Aug. 11, 2026

(54) SYSTEMS AND METHODS FOR CHAINABLE COMPUTE ANALYTICS CONTAINER

(71) Applicant: Rockwell Automation Technologies, Inc., Mayfield Heights, OH (US)

(72) Inventors: Michael J. Anthony, Milwaukee, WI (US); Nathaniel S. Sandler, Chagrin Falls, OH (US); David C. Mazur, Mequon, WI (US); Christopher W. Como, Chagrin Falls, OH (US); James M. Teal, New Brunswick, NJ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 593 days.

(21) Appl. No.: 18/117,922

(22) Filed: Mar. 6, 2023

(65) Prior Publication Data

US 2024/0303107 A1 Sep. 12, 2024

(51) Int. Cl.
*G06F 9/48* (2006.01)
*G06F 9/50* (2006.01)

(52) U.S. Cl.
CPC .......... *G06F 9/4881* (2013.01); *G06F 9/5066* (2013.01); *G06F 2209/5017* (2013.01)

(58) Field of Classification Search
CPC ........... G06F 9/4881; G06F 2209/5017; G06F 9/5066
See application file for complete search history.

(56) References Cited

U.S. PATENT DOCUMENTS

| | | | |
|---|---|---|---|
| 10,715,388 B2 | 7/2020 | Fildebrandt et al. | |
| 11,182,206 B2 | 11/2021 | Jung et al. | |
| 11,305,796 B1 * | 4/2022 | Shue | B61L 23/042 |
| 11,474,873 B2 | 10/2022 | Biernat et al. | |

(Continued)

FOREIGN PATENT DOCUMENTS

| | | |
|---|---|---|
| KR | 20200027783 A | 3/2020 |
| WO | 2020184362 A1 | 9/2020 |

OTHER PUBLICATIONS

Extended European Search Report for European Patent Application No. 21179775.8, dated Nov. 25, 2021, 9 pages.

(Continued)

*Primary Examiner* — Michael W Ayers
(74) *Attorney, Agent, or Firm* — Fletcher Yoder, P.C.

(57) ABSTRACT

A method includes receiving (1) a request to perform of one or more analytics operations, and (2) data associated with an industrial automation system, wherein the industrial automation system comprises a plurality of devices configured to perform a plurality of automation operations, and wherein each of the plurality of devices comprises a compute surface configured to perform one or more software tasks, determining a plurality of data processing tasks included in the one or more analytics operations, identifying a portion of the plurality of devices to perform the plurality of data processing tasks based on the compute surface available for each of the plurality of devices, deploying one or more containers to each of the portion of the plurality of devices, and providing first instructions to a first container of the one or more containers to perform a first data processing task of the plurality of data processing tasks.

20 Claims, 7 Drawing Sheets

(56) References Cited

U.S. PATENT DOCUMENTS

| | | | |
|---|---|---|---|
| 11,513,877 | B2 | 11/2022 | Biernat et al. |
| 2018/0024537 | A1 | 1/2018 | Chauvet et al. |
| 2018/0054469 | A1 | 2/2018 | Simoncelli |
| 2019/0306022 | A1* | 10/2019 | Shimoga Manjunatha ................. H04L 43/0876 |
| 2019/0377604 | A1 | 12/2019 | Cybulski |
| 2020/0136906 | A1 | 4/2020 | Bernat et al. |
| 2020/0249928 | A1 | 8/2020 | Zeng et al. |
| 2020/0278892 | A1 | 9/2020 | Nainar et al. |
| 2020/0303060 | A1* | 9/2020 | Haemel .................. G06N 3/082 |
| 2020/0311617 | A1 | 10/2020 | Swan et al. |
| 2021/0089354 | A1 | 3/2021 | Nixon et al. |
| 2021/0200814 | A1 | 7/2021 | Tal et al. |
| 2021/0218617 | A1 | 7/2021 | Palavalli et al. |
| 2021/0343054 | A1* | 11/2021 | Wang .................... G06T 11/006 |
| 2021/0382727 | A1 | 12/2021 | Vigil et al. |
| 2022/0027217 | A1 | 1/2022 | Thoemmes et al. |
| 2022/0091572 | A1 | 3/2022 | Biernat et al. |
| 2023/0083255 | A1* | 3/2023 | Ebrahimi ............. G07C 5/0808 701/31.6 |
| 2023/0156074 | A1* | 5/2023 | Kim .................... H04L 12/4633 709/201 |
| 2023/0324870 | A1* | 10/2023 | Götz .................... G05B 19/052 700/86 |
| 2024/0061716 | A1* | 2/2024 | Bennetone ............ G06F 9/5077 |

OTHER PUBLICATIONS

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-picfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022,12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Liu, Y. et al., "A Data-Centric Internet of Things Framework Based on Azure Cloud," IEEE Access, vol. 7, Mar. 27, 2019, 20 pages.

* cited by examiner

SYSTEMS AND METHODS FOR CHAINABLE COMPUTE ANALYTICS CONTAINER

BACKGROUND

The present disclosure generally relates to systems and methods for implementing a container orchestration system in an operational technology (OT) network associated with one or more industrial automation systems. More particularly, embodiments of the present disclosure are related to systems and methods for leveraging container orchestration systems to distribute computing operations across disparate computing resources.

Industrial automation systems are managed and operated using automation control and monitoring systems (e.g., industrial control systems), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operating in the OT environment are used to control industrial automation devices accessible via an OT network. One or more containers may be deployed to a compute surface at or near an industrial automation device to analyze collected data or perform other functions related to the industrial automation device. However, in some cases, the compute surface to which the containers are deployed may not have sufficient resources to perform the functions or an operator may wish to offload some of the functions to other computing resources.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium stores instructions that, when executed by a processor, cause the processor to receive (1) a request to perform of one or more analytics operations, and (2) data associated with an industrial automation system, wherein the industrial automation system comprises a plurality of devices configured to perform a plurality of automation operations within the industrial automation system, and wherein each of the plurality of devices comprises a compute surface configured to perform one or more software tasks, determine a plurality of data processing tasks included in the one or more analytics operations, identify a portion of the plurality of devices to perform the plurality of data processing tasks based on the compute surface available for each of the plurality of devices, generate a distributed data processing flow that defines a sequence in which the plurality of data processing tasks are performed, and assigns each of the plurality of data processing tasks to one or more of the portion of the plurality of devices, and deploy one or more containers to each of the portion of the plurality of devices, wherein each of the one or more containers is configured to perform at least one of the plurality of data processing tasks based on the distributed data processing flow.

In another embodiment, a method includes receiving (1) a request to perform of one or more analytics operations, and (2) data associated with an industrial automation system, wherein the industrial automation system comprises a plurality of devices configured to perform a plurality of automation operations within the industrial automation system, and wherein each of the plurality of devices comprises a compute surface configured to perform one or more software tasks, determining a plurality of data processing tasks included in the one or more analytics operations, identifying a portion of the plurality of devices to perform the plurality of data processing tasks based on the compute surface available for each of the plurality of devices, deploying one or more containers to each of the portion of the plurality of devices, and providing first instructions to a first container of the one or more containers to perform a first data processing task of the plurality of data processing tasks.

In a further embodiment, a non-transitory computer readable medium stores instructions that, when executed by a processor, cause the processor to receive (1) a request to perform of one or more analytics operations, and (2) data associated with an industrial automation system, wherein the industrial automation system comprises a plurality of devices configured to perform a plurality of automation operations within the industrial automation system, and wherein each of the plurality of devices comprises a compute surface configured to perform one or more software tasks, determine a plurality of data processing tasks included in the one or more analytics operations, identify a portion of the plurality of devices to perform the plurality of data processing tasks based on the compute surface available for each of the plurality of devices, deploy a plurality of containers to the portion of the plurality of devices, provide first instructions to a first container of the plurality of containers to perform a first data processing task of the plurality of data processing tasks and provide first resultant data from the first data processing task to a second container of the plurality of containers, and providing second instructions to the second container of the plurality of containers to perform a second data processing task of the plurality of data processing tasks upon receipt of the first resultant data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
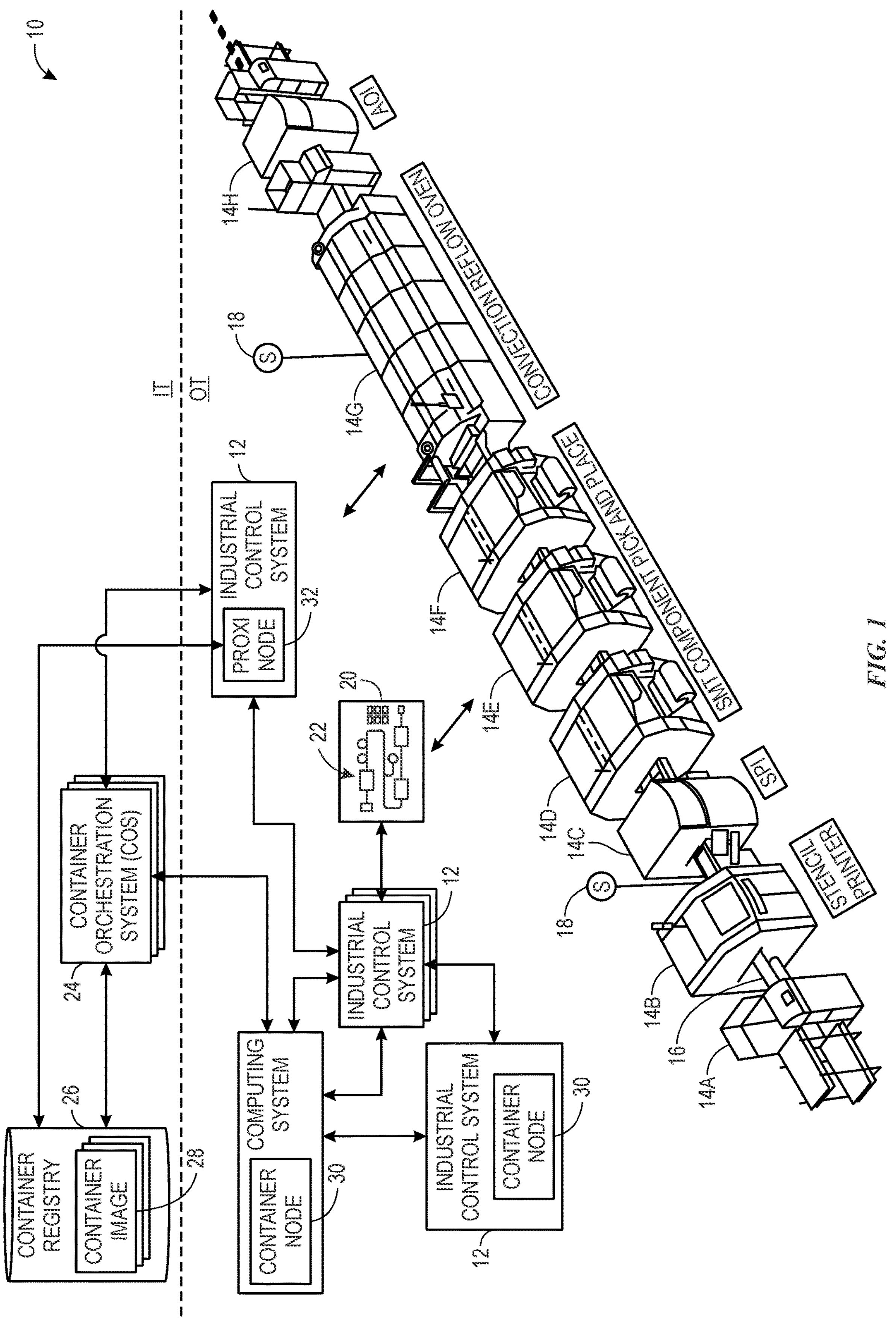
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed toward chainable compute analytics containers. Specifically, a request to perform analytics operations may be received, or an alarm, an alert, a dataset, etc. may be received that triggers performance of analytics operations. A container orchestration system may identify data processing tasks included in the analytics operations, identify computing resources to perform the identified data processing tasks, and develop a distributed data processing flow for performing the analytics operations that assigns data processing tasks to particular devices, as well as a sequence for the data processing tasks. The container orchestration system deploys one or more containers to the identified computing resources in accordance with the distributed data processing flow and transmits data to the containers for performance of the data processing tasks. In some embodiments, the containers may also be provided with the distributed data processing flow and/or instructions for what to do with resultant data when the container has completed the assigned data processing tasks. In some embodiments, the container may provide the resultant data back to the computing resource from which data was received. In other embodiments, the container may provide the resultant data, in some cases along with other data (e.g., the original data, the request for analytics operations, the distributed data processing flow, instructions for performing subsequent data processing tasks, etc.) to one or more additional containers or computing resources in the distributed data processing flow for additional processing. Accordingly, the containers and/or computing resources may be chained together across compute surfaces, container pods, computing devices, IT/OT networks, and so forth to perform the analytics operations.

The analytics operations may include, for example, running analytics to calculate one or more metrics (e.g., key performance indicators), apply one or more algorithms, apply one or more machine learning models, identify software and/or hardware on the IT and/or OT networks, diagnose a condition causing the alert, identify the likely cause of the condition, and/or identify, and in some cases implement, one or more remedial actions to resolve the associated alert, identify what data is stored where and, in some case, generate maps, convert data to different communication protocols, encrypt and/or decrypt data, provision and/or enforce policies (e.g., security policies), manage firmware, discover devices on the IT and/or OT network, determine device health, perform asset management, train machine learning models, perform device calibration, and so forth. In some embodiments, the data processing tasks may involve, for example, accessing a lookup table, accessing a database, using a decision tree, training and/or applying a machine learning or artificial intelligence (AI) model, analyzing historical data, and so forth. In some embodiments, once the analytics operations have been completed, some or all of the containers may be spun down. However, in other embodiments, one or more of the containers may continue to run (e.g., running additional analytics operations) after the analytics operations have been completed.

Additional details with regard to chainable compute analytics containers will be discussed below with reference to FIGS. 1-9.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. It should be understood, however, that for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, managing data transmission between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, compute surfaces, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
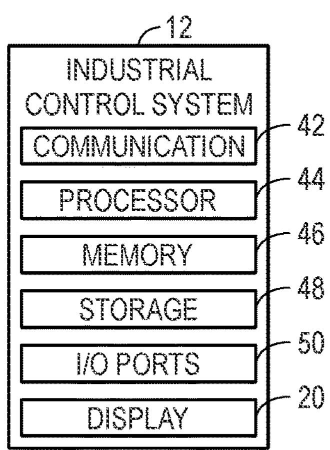
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
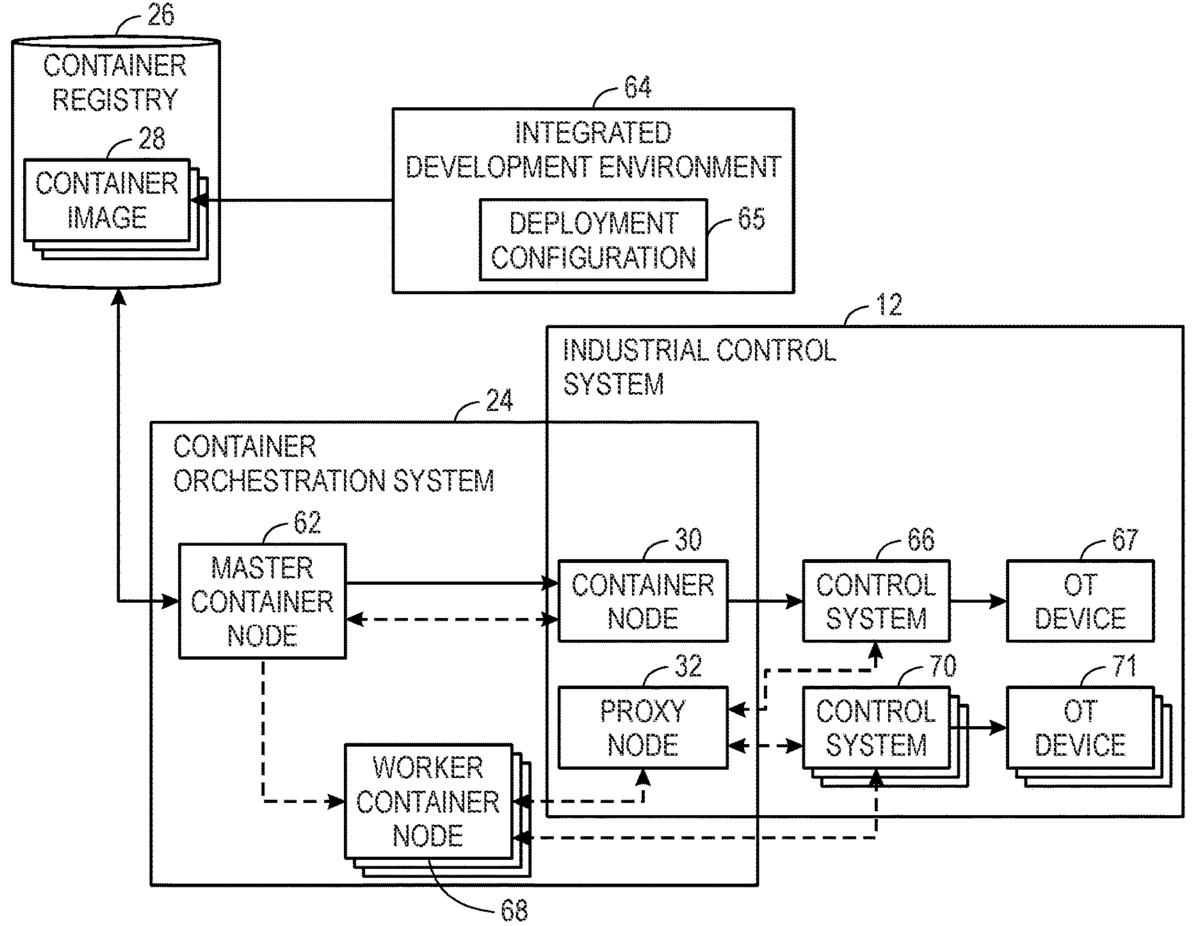
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resource controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP. Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestration system 24 and the OT-based industrial control system 12.

Figure 4:
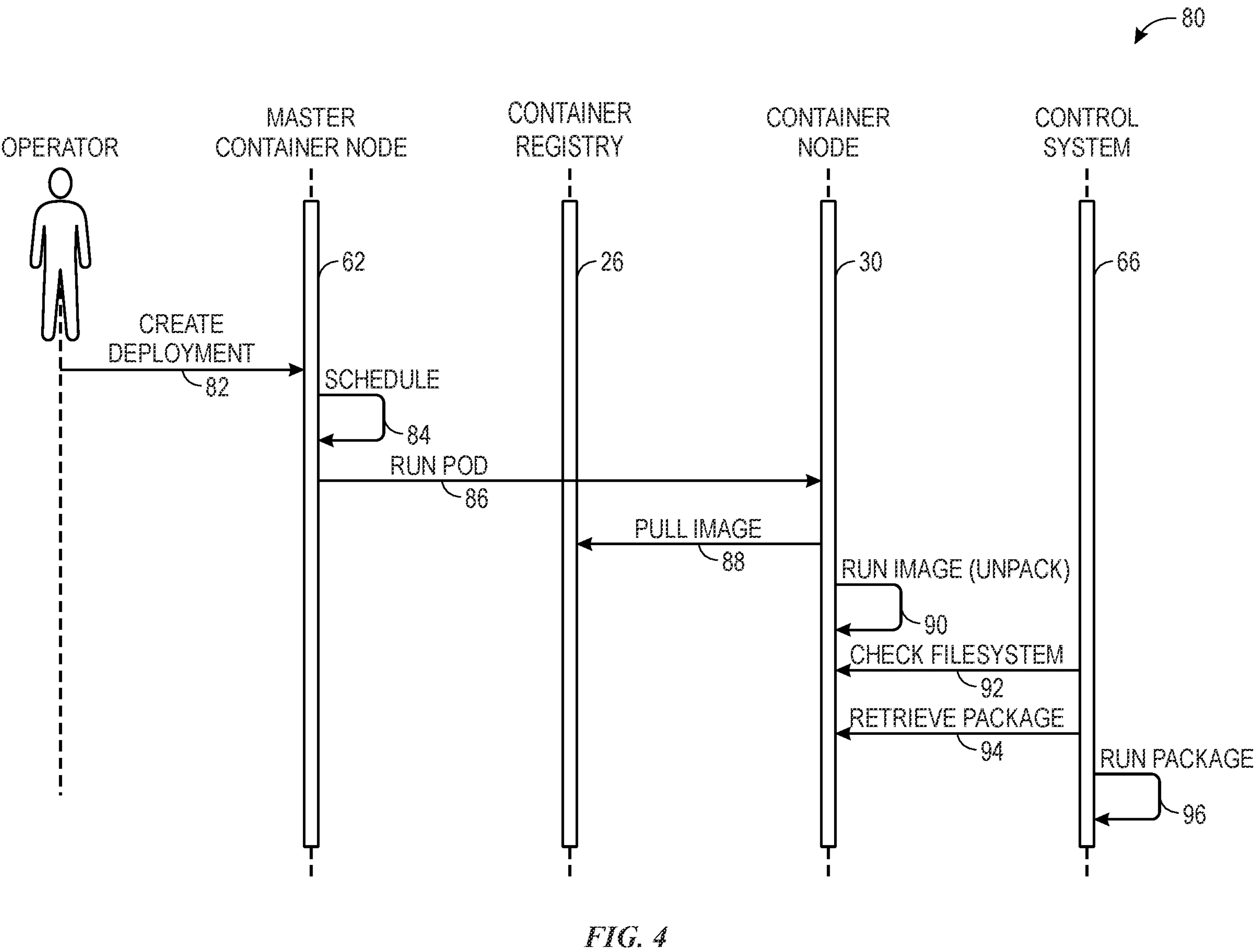
FIG. 4 is a sequence diagram illustrating the deployment of container pods to industrial control systems in the OT network of FIG. 3, in accordance with an embodiment.

FIG. 4 illustrates a sequence diagram 80 that tracks the deployment of a container using the master container node 62 and the container node 30 described above with reference to FIG. 3. At step 82, the IDE tool 64 may create a deployment of the deployment configuration file 65 to the master container node 62. After receiving the deployment configuration file 65, the master container node 62 may identify a container node 30 that may fit the constraint specifications (e.g., memory, CPU availability) provided in the deployment configuration file 65. That is, the master container node 62 performs scheduling operations that involve checking the state data for each node of the container orchestration system 24, determining whether a suitable node exists for the constraints provided in the deployment configuration file 65, and the like.

After identifying the suitable container node, at step 84, the master container node 62 may schedule the deployment of the container to the respective container node 30. At step 86, the master container node 62 may deploy a pod to the container node 30, which may cause the container node 30 to retrieve a container image 28 from the container registry 26 at step 88. In this way, the container node 30 is configured to receive pods from the master container node 62 and execute the pods, although the control system 66 of the industrial control system 12 may not be able to execute the pod. After pulling the container image 28 from the container registry 26, the container node 30 may, at step 90, run the container image 28 or unpack the container image 28 and store an application or operation executable by the control system 66 in a file system. At step 92, the control system 66 may check the file system of the container node 30 for updates or newly stored packages. At step 94, the control system 66 may retrieve the stored package that may include the container scheduled for operation by the control system 66 by the master container node 62 at step 84. At step 96, the control system 66 may execute the package retrieved from the file system of the container node 30. The container node 30 may then monitor the operations of the package being executed on the control system 66, the state (e.g., memory, CPU usage) of the control system 66 and send updates to the master container node 62. If the container node 30 sends an update indicative of the package no longer executing the package, the master container node 62 may schedule deployment of another pod to another container node 30 for execution to maintain the desired state.

Figure 5:
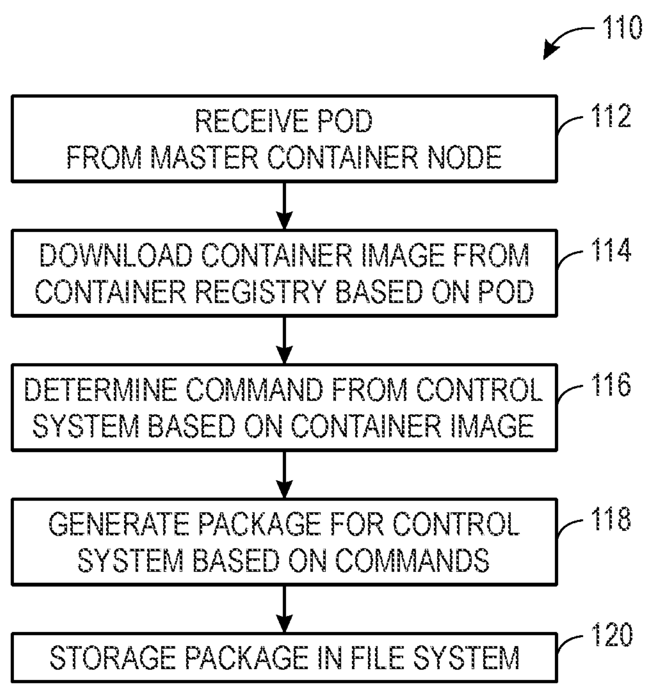
FIG. 5 is a flow chart of a method for the industrial control system passively implementing commands received via the control orchestration system, in accordance with an embodiment.

Keeping the foregoing in mind, FIG. 5 illustrates a method 110 in which the container node 30 may implement to coordinate activities via the master container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 5, at block 112, the container node 30 may receive a pod from the master container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the master container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the master container node 62, or any other suitable communication schemes.

After receiving the container images 28, at block 116, the container node 30 may run or unpack the container images 28 and determine commands that may be performed by the control system 66 based on the container images 28. That is, the container images 28 may include software applications that are executable by container nodes 30. However, the software applications may not be executable by the control system 66. As such, the container node 30 may determine commands for the control system 66 that correspond to the software applications encapsulated in the container images 28. In some embodiments, certain operations in the software applications may be mapped to certain operations that may be performed by the control system 66. For example, software application commands for create, run, start, pause, stop, and delete may map to download, download/run, run, idle, and unload commands, respectively, which may be performed by the control system 66. In some embodiments, the control system 66 may be used to perform a macro batch control sequence.

After determining the commands that may be implemented by the control system 66 based on the container images 28, at block 118, the container node 30 may generate a package that may be retrieved and executed by the control system 66. That is, the container node 30 may organize or structure the determined commands into a software package that may be used by the control system 66. For example, if the control system 66 corresponds to a PLC, the package may be organized according to a programming structure (e.g. ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of commands that may be provided by the master container node 62, as opposed to performing all of the commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of commands provided by the master container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that commands received from the master container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may extend the functions available via the container orchestration system 24 to OT devices 67 that are not typically visible to the master container node 62 of the container orchestration system 24. To operate in the passive-direct mode, the container node 30 may include applications and/or APIs that interface directly with the control system 66 and the master container node 62. As such, the container node 30 may provide a bi-directional bridge of communication between the control system 66 and the master container node 62. In some embodiments, the container node 30 may include an API that translates the OT data received from the control system 66 into IT data that may be interpretable by the master container node 62. As such, the container node 30 may provide the master container node 62 with visibility into the operations and states of the OT devices 67 operating in the OT space.

Figure 6:
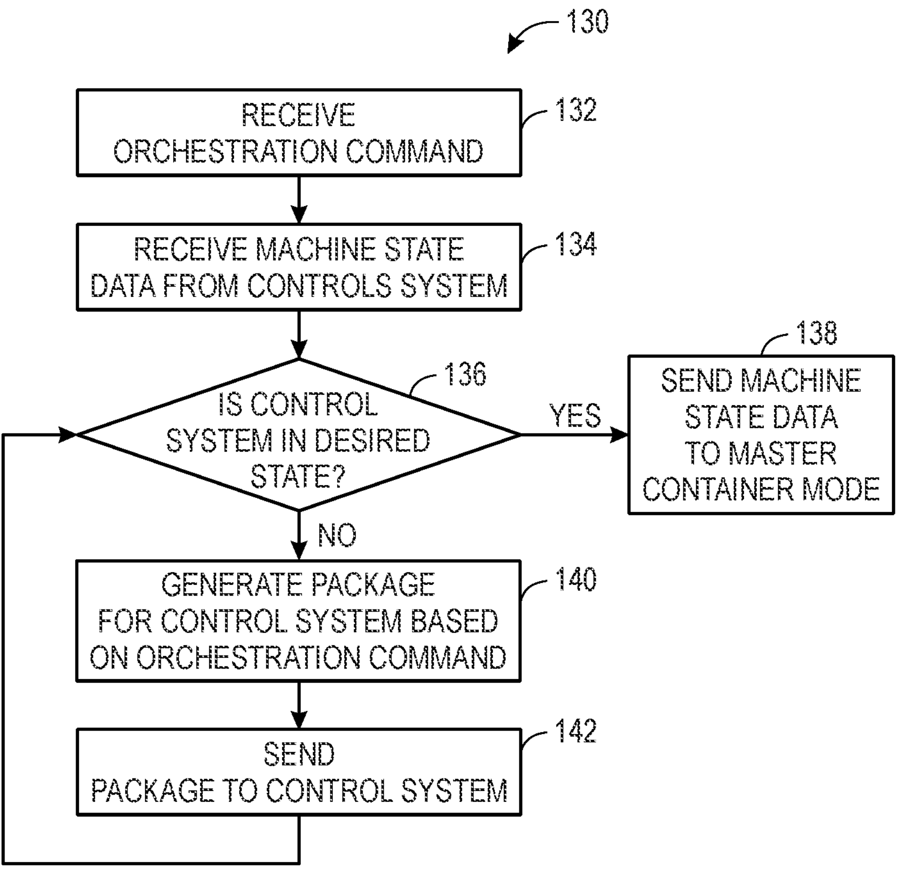
FIG. 6 is a flow chart of a method for the industrial control system actively implementing commands received via the control orchestration system, in accordance with an embodiment.

With this in mind, FIG. 6 illustrates a method 130 for the container node 30 directly sending packages to the control system 66 and machine state data to the master container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands received from the master container node 62 or the like and directly interface with the control system 66 to verify that the control system 66 is operating at the desired state.

Referring to FIG. 6, at block 132, the container node 30 may receive an orchestration command from the master container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive) of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the master container node 62. The master container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operates in the passive-direct mode because the container node 30 may directly send commands that cause the control system 66 to change operations. For example, instead of the control system 66 periodically checking the filesystem, as described above with respect to FIG. 5 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 30 may generate an event notification that causes an API or other component of the control system 66 to react in response to detecting the event notification. In other embodiments, the container node 30 may determine that it is safe to perform certain actions, such as changing state to download a firmware update, perform maintenance/service, etc. In this way, the container node 30 may actively participate in the coordination of containers with a respective control system 66 based on orchestration commands received passively from the master container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the master container node 62 to extract relevant data (e.g., machine state data) to perform analysis operations and to ensure that the container orchestration system 24 and the connected control systems 66 are operating at the desired state. Based on the results of its scheduling operations, the master container node 62 may issue supervisory control commands to targeted OT devices via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may correspond to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

Figure 7:
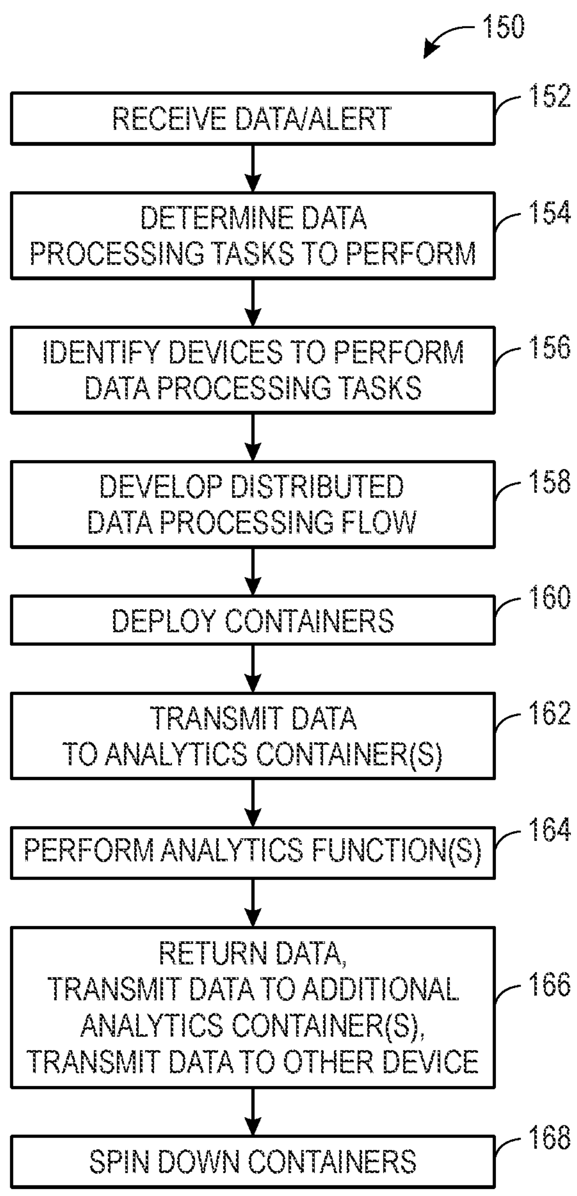
FIG. 7 is a flow chart of a method for implementing one or more chainable compute analytics containers using the container orchestration system of FIG. 3, in accordance with an embodiment.

Returning to FIG. 3, an OT device 67, 71 may collect and/or generate data to be analyzed. Data collection/generation may be in response to a problem or condition being detected, in response to some period of time elapsing, in response to some moment in time passing, in response to a request (e.g., which could be manually or automatically generated), in response to an alert, alarm, or other indication of a problem being experienced, in response to data being received from another device, and so forth. One or more containers may be deployed to the OT device 67, 71 or to a nearby compute surface, which may coordinate with one or more existing containers, which may be distributed across multiple compute surfaces to analyze the data. Accordingly, data analysis/processing tasks may be broken up and performed using available computing resources within the industrial automation system. Chaining computing resources together to perform computational tasks, such as data analysis/processing, may be referred to as chainable compute. With the foregoing in mind, FIG. 7 is a flow chart of a method 150 for chainable compute analytics containers.

At block 152, data or an alert is received. In some embodiments, the data or alert may be included in, accompanied by, or preceded by a request for performance of one or more analytics operations. The data or alert may be generated by the device itself, a controller communicatively coupled to the device, an application-specific container monitoring operation of the device, a sensor monitoring one or more aspects of the device's performance of an industrial automation function or one or more conditions around the device, an edge device disposed in the OT network, a cloud-based computing device that monitors one or more aspects of the device, or some other device within the OT network. The data may be collected and the alert or request may be generated in response to a problem or condition being detected (e.g., a device or component ceasing to operate, a lack of communication from a device or component, communication of a problem or condition by a device or component, measured values falling above/below a threshold value, or outside of some anticipated range, a part or component breaking or seizing, a sensed condition, an unauthorized action or activity taking place, etc.), an alert, alarm, or other indication of a problem being experienced, a period of time elapsing or some moment in time passing, a manually or automatically generated request, in response to data being received from another device, and so forth.

At block 154, a set of data processing tasks to be performed are identified. For example, the data processing tasks may include running analytics to calculate one or more metrics (e.g., key performance indicators), apply one or more algorithms, apply one or more machine learning models, identify software and/or hardware on the IT and/or OT networks, diagnose a condition causing the alert, identify the likely cause of the condition, and/or identify, and in some cases implement, one or more remedial actions to resolve the associated alert, identify what data is stored where and, in some case, generate maps, convert data to different communication protocols, encrypt and/or decrypt data, provision and/or enforce policies (e.g., security policies), manage firmware, discover devices on the IT and/or OT network, determine device health, perform asset management, train machine learning models, perform device calibration, and so forth. In some embodiments, the data processing tasks may involve, for example, accessing a lookup table, accessing a database, using a decision tree, training and/or applying a machine learning or artificial intelligence (AI) model, analyzing historical data, and so forth. In some embodiments, data may be collected from a device as it continues to run to analyze and/or diagnose the condition of the device, and in some cases, identify one or more remedial actions to address the condition.

If the data processing tasks are being performed in response to an alert, data collected from the device in the time leading up to the alert may be analyzed to identify any anomalies or indications of the condition. Further, data may be collected from around the device (e.g., sensors and/or other devices upstream, downstream, or in the vicinity of the device) before the alert was issued, the time immediately before, during and after the alert was issued, or in the time following the alert, and analyzed to diagnose the condition. In some embodiments, scripts or algorithms may be run on collected data, the collected data may be compared to historical data, or the collected data may be provided to a machine learning model for analysis. Further supervised or unsupervised data analysis may be configured for feature extraction of conditions for which the system may or may not be monitored. For example, new data items may be recognized and collected during an operation that were not necessarily identified before the operation and then analyzed and utilized to improve the underlying process. As is discussed in more detail below, collected data may also be transmitted to one or more containers (e.g., chainable compute analytics containers) running on different compute surfaces, which in some embodiments may be outside of the OT network (e.g., to a remote server or a cloud-based computing device), for analysis.

At block 156, the process 150 identifies devices and/or compute surfaces on which to run the chainable compute analytics containers that perform the identified data processing tasks. Because the control systems and other OT devices present within the industrial automation system may have a limited amount of computing resources (e.g., compute power, memory, network bandwidth, or other computing parameters) to perform the identified data processing tasks, because an operator of the industrial automation system may prefer to keep computing operations performed on some compute surfaces thin, and/or because some of the identified data processing tasks may be computationally intensive, certain identified data processing tasks may be distributed across a number of computing resources (e.g., compute surfaces, containers, edge devices, servers, desktop computers, laptop computers, tablets, mobile devices, human machine interfaces, industrial automation controllers, internet of things (IoT) devices, or any device having a processor, etc.) available on various devices positioned within the industrial automation system. Indeed, each computing resource may perform a portion of the data processing tasks and provide resultant data to another computing resource, which may or may not be running on a different compute surface, to perform another portion of the data processing tasks. As previously described, multiple containers running on the same compute surface may be referred to as a pod. At block 156, the process 150 identifies suitable compute surfaces and/or computing resources available to perform a set of data processing tasks in a distributed fashion.

At block 158, a distributed data processing flow is generated that defines how the data processing tasks from block 154 are distributed among the compute surfaces and/or computing resources identified in block 156. The data processing flow may be defined by one or more deployment configuration files. In some embodiments, the data processing tasks and the identified computing resources may be provided to a machine learning model that assigns data processing tasks to computing resources. In other embodiments, capabilities used to perform certain data processing tasks may be matched with computing resources having the capabilities. In further embodiments, lookup tables, databases, historical data, sets of data processing task assignment rules, and so forth may be used to determine which data processing tasks are assigned to what computing resources.

The distributed data processing flow may also define the order in which data processing tasks are performed. In some embodiments, the output of one or more first tasks act as the input for one or more second tasks. Accordingly, the one or more first tasks may be scheduled to be performed before the one or more second tasks. However, in some cases, tasks may be performed in any order, and thus an order may not be defined by the distributed data processing flow. Along these lines, the distributed data processing flow may schedule multiple data processing tasks to take place in parallel. For example, a first computing resource may perform a first task at the same time that a second computing resource performs a second task. In some embodiments, the outputs of the first and second tasks may be provided as inputs to a third task being performed by a second computing resource. Additionally, or alternatively, first and second computing resources may perform the same or similar tasks in parallel and the results compared. In other embodiments, the output of a data processing task may act as the input for multiple subsequent data processing tasks. Further, in some embodiments, multiple data processing tasks may be performed by a single computing resource, in series, in parallel, or some combination thereof.

At block 160, the process 150 (e.g., via a container orchestration system and/or container deployment system) deploys containers to the one or more computing devices identified at block 156. In some embodiments, one or more pods of containers may be deployed that include various combinations of containers, having different roles/purposes, and configured to coordinate to perform a particular task or group of tasks. If tasks are assigned to computing resources that may or may not be executing containers, instructions may be provided to the computing resources or devices to perform the assigned data processing tasks. Accordingly, the coordination between containers and/or other computing resources may be via chainable compute. As used herein chainable compute refers to a set of distributed computing resources (e.g., computing devices, compute surfaces, containers, virtual machines, etc.) that are capable of breaking a computing operation into component tasks and transmitting data between one another to complete the computing operation. Accordingly, a first computing resource may receive data from one or more second computing resources, perform one or more data processing operations on the received data, and then output results of the data processing operations back to the second computing resources or to one or more third computing resources. As such, sequences of data processing operations may be broken up into tasks, or sets of tasks, and assigned to specific computing resources within the set of distributed computing resources, which coordinate to complete the sequence of data processing operations.

As described above, deploying a container may include, for example, transmitting a container image to a device, compute surface, container, or other computing resource, etc. The container image defines various characteristics of the container and how the container is to run. The device, compute surface, computing resource, etc. executes the container image in order to execute the container.

At block 162, data is transmitted to one or more of the identified computing resources to perform one or more steps of the distributed data processing flow. In some embodiments, the data to be processed by a container may be transmitted along with the container image when the container is deployed (block 160). Further, in some embodiments, the data may be transmitted along with the distributed data processing flow or instructions for what the respective identified computing resources are to do within the distributed data processing flow, and/or what the respective identified computing resources are to do when their portion of the distributed data processing flow is complete. For example, the data may be transmitted with instructions to perform a particular analytical operation on the transmitted data and then transmit data (e.g., the original data, the results of the analytical operation, the distributed data processing flow, instructions for performing subsequent analytical operation, and so forth) to a subsequent identified computing resource.

At block 164, the containers perform the one or more data processing tasks. During operation, the containers may receive data from another container or computing resource, perform one or more data processing tasks, and then transmit the results of the data processing tasks to back to the container from which the data was received or transmit the resultant data to another container or computing resource for completion of additional tasks. In some embodiments, the containers may be monitored (e.g., by the container orchestration system or the industrial control system) during performance of the one or more data processing tasks. This may include, for example, collecting data from containers themselves, inspecting data transmitted between containers, and so forth, and comparing the data to one or more container deployment files. If a container, or a device executing a container, encounters a problem and either the container or the device executing a container is unable to continue to operate as set forth in the container deployment file, the process (e.g., via the container orchestration system) may deploy a replacement container, either to the same device or a different device. In some embodiments, the container orchestration system may utilize collected data from the failed container and provide the data to the replacement container so the replacement container can resume activities being performed by the failed container.

At block 166, after completion of the analytics functions and/or the data processing tasks, a respective container may return the results of the data processing tasks to the computing resource from which the data was received or transmit the results of the data processing tasks and any other data (e.g., the original data, processed data, instructions for performing data processing tasks, the distributed data processing flow, etc.) to a subsequent computing resource for additional data processing tasks or results aggregation/collection in accordance with the distributed data processing flow. In some embodiments, the subsequent computing resource may be another container in the same pod of containers running on a common compute surface, a container that is outside of the pod of containers running on the compute surface, another computer device, and so forth. In some embodiments, the subsequent computing resource may be in a different IT or OT network from the transmitting computing resource.

At block 168, one or more of the deployed containers may be spun down. For example, the container orchestration system may transmit instructions to the devices or other computing surfaces executing the containers to stop executing the containers and make computing resources utilized by the containers available for other purposes. However, in other embodiments in which data processing tasks may be ongoing, some or all of the containers may continue running.

Figure 8:
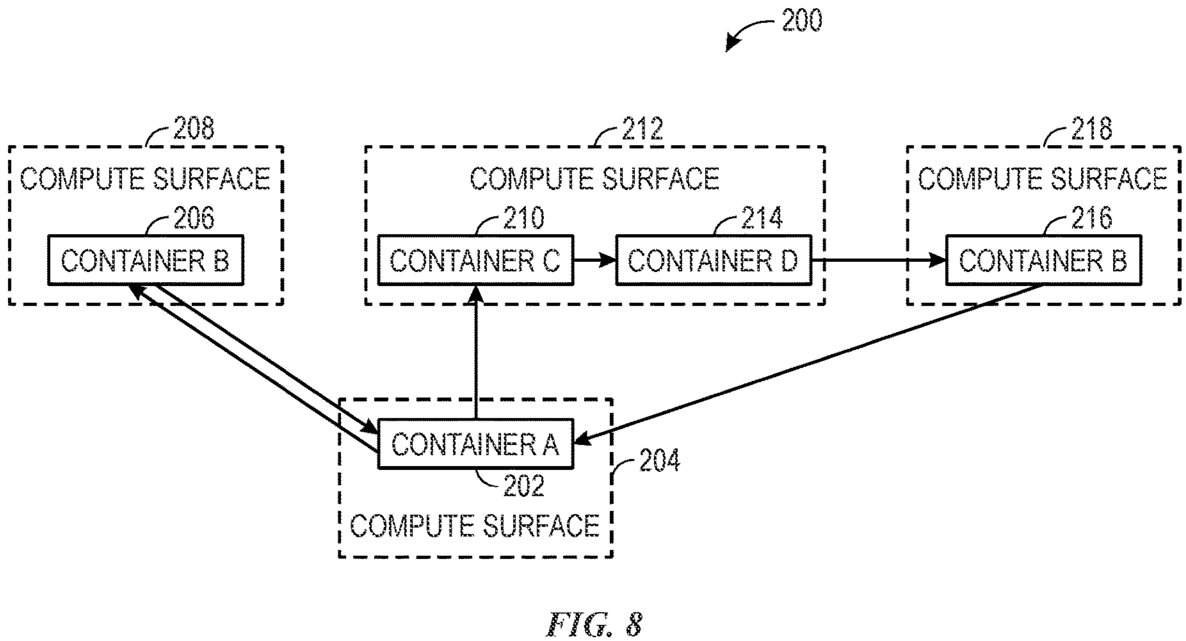
FIG. 8 is an example embodiment of a data processing flow carried out by a set of distributed computing resources, such as the containers deployed by the container orchestration system of FIG. 3, including one or more chainable compute analytics containers, in performance of the method shown in FIG. 7, in accordance with an embodiment.

With the foregoing in mind, FIG. 8 represents an example of a distributed data processing flow 200 carried out by a set of distributed computing resources. As shown, container A 202, running on compute surface 204 receives, retrieves, collects, and/or generates data. In some embodiments, container A 202 may perform one or more initial computing tasks (e.g., data processing tasks) and provide data to container B 206, which may be running on a different compute surface 208. Container B 206 may perform one or more computing tasks (e.g., analytic functions, data processing operations, etc.) using the received data. The one or more computing tasks may include, for example, running analytics to calculate one or more metrics (e.g., key performance indicators), applying one or more algorithms, applying one or more machine learning models, identifying software and/or hardware on the IT and/or OT networks, diagnosing a condition causing an alert, identifying the likely cause of a condition, and/or identifying, and in some cases implementing, one or more remedial actions to resolve an alert, identifying what data is stored where and, in some case, generating maps, converting data to different communication protocols, encrypting and/or decrypting data, provisioning and/or enforcing policies (e.g., security policies), managing firmware, discovering devices on the IT and/or OT network, determining device health, performing asset management, training machine learning models, performing device calibration, and so forth. In some embodiments, the data processing tasks may involve, for example, accessing a lookup table, accessing a database, using a decision tree, training and/or applying a machine learning or artificial intelligence (AI) model, analyzing historical data, and so forth. Container B 206 transmits results of the one or more computing tasks back to container A 202. In some embodiments, container B 206 may transmit results of the one or more computing tasks along with other data, such as the original data, modified data, information about how the computing tasks were performed, encryption keys, and so forth.

Though container B 206 receives data from container A 202, performs one or more computing tasks on the received data, and returns the results of the one or more computing tasks to container A 202, it should be understood that in some embodiments, data may be transmitted between multiple containers such that computing tasks are distributed among multiple containers before data or results are returned to an initial container. Further, in some embodiments, data or results may be provided to a computing resource other than the initial container.

For example, as shown in FIG. 8, container A 202 may provide data to container C 210, which may be running on a third compute surface 212. Container C 210 may perform one or more computing tasks, such as running analytics to calculate one or more metrics (e.g., key performance indicators), applying one or more algorithms, applying one or more machine learning models, identifying software and/or hardware on the IT and/or OT networks, diagnosing a condition causing an alert, identifying the likely cause of a condition, and/or identifying, and in some cases implementing, one or more remedial actions to resolve an alert, identifying what data is stored where and, in some case, generating maps, converting data to different communication protocols, encrypting and/or decrypting data, provisioning and/or enforcing policies (e.g., security policies), managing firmware, discovering devices on the IT and/or OT network, determining device health, performing asset management, training machine learning models, performing device calibration, and so forth. In some embodiments, the data processing tasks may involve, for example, accessing a lookup table, accessing a database, using a decision tree, training and/or applying a machine learning or artificial intelligence (AI) model, analyzing historical data, and so forth. Container C 210 may transmit results of the one or more computing tasks to container D 214, which may or may not be running on the same compute surface 212 as container C 210. As previously described, container C 210 may transmit results of the one or more computing tasks along with other data, such as the original data, modified data, information about how the computing tasks were performed, encryption keys, and so forth.

Container D 214 may receive data from container C 210 and perform one or more additional computing tasks in accordance with the distributed data processing flow. As previously described, these computing tasks may include, for example, running analytics to calculate one or more metrics, such as key performance indicators, applying one or more algorithms, applying one or more machine learning models, identifying software and/or hardware on the IT and/or OT networks, diagnosing a condition causing an alert, identifying the likely cause of a condition, and/or identifying, and in some cases implementing, one or more remedial actions to resolve an alert, identifying what data is stored where and, in some case, generating maps, converting data to different communication protocols, encrypting and/or decrypting data, provisioning and/or enforcing policies, such as security policies, managing firmware, discovering devices on the IT and/or OT network, determining device health, performing asset management, training machine learning models, performing device calibration, and so forth. Container D 214 may transmit results of the one or more computing tasks to container E 216, which may be running on a fourth compute surface 218, different from that of container A 202, container B 206, container C 210, and/or container D 214. As with the other containers, container D 214 may transmit results of the one or more computing tasks along with other data, such as the original data, modified data, information about how the computing tasks were performed, encryption keys, and so forth.

Container E 216 may receive data from container D 214 and perform one or more additional computing tasks in accordance with the distributed data processing flow. As previously described, these computing tasks may include, for example, running analytics to calculate one or more metrics, such as key performance indicators, applying one or more algorithms, applying one or more machine learning models, identifying software and/or hardware on the IT and/or OT networks, diagnosing a condition causing an alert, identifying the likely cause of a condition, and/or identifying, and in some cases implementing, one or more remedial actions to resolve an alert, identifying what data is stored where and, in some case, generating maps, converting data to different communication protocols, encrypting and/or decrypting data, provisioning and/or enforcing policies, such as security policies, managing firmware, discovering devices on the IT and/or OT network, determining device health, performing asset management, training machine learning models, performing device calibration, and so forth. Container E 216 transmits results of the one or more computing tasks, which may include results aggregated from computing tasks performed by container B 206, container C 210, and/or container D 214 back to container A 202. However, in some embodiments, container E 216 may transmit results of the one or more computing tasks along with other data, such as the original data, modified data, information about how the computing tasks were performed, encryption keys, and so forth.

Figure 9:
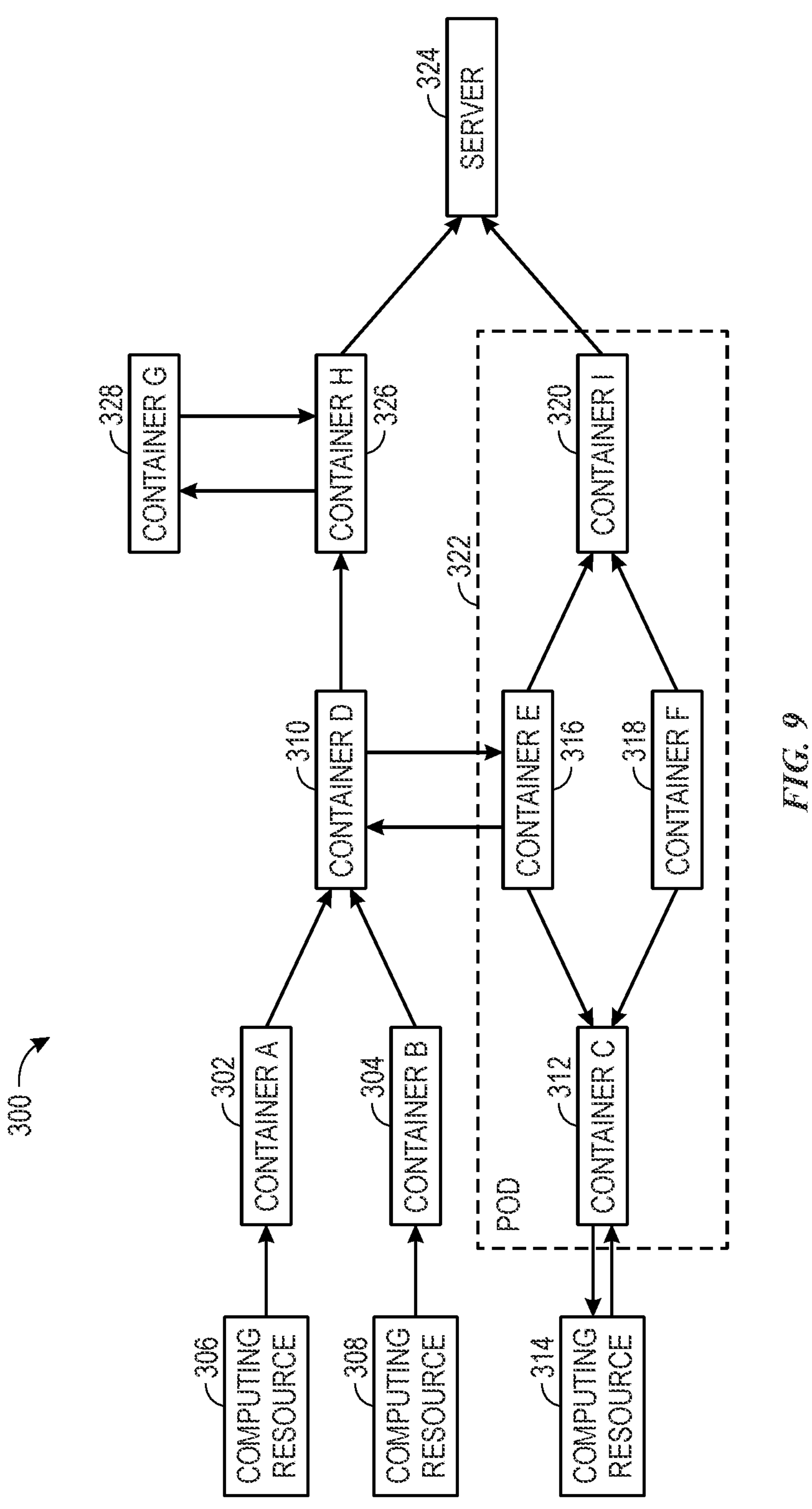
FIG. 9 is another example embodiment of a data processing flow carried out by a set of distributed computing resources, such as the containers deployed by the container orchestration system of FIG. 3, including one or more chainable compute analytics containers, in performance of the method shown in FIG. 7, in accordance with an embodiment.

FIG. 9 represents an additional example of a data processing flow 300 carried out by a set of distributed computing resources. As shown, container A 302 and container B 304 receive data from respective computing resources 306, 308. Container A 302 and container B 304 may perform one or more initial computing tasks (e.g., data processing tasks) and provide data to container D 310 for additional data processing (e.g., performing one or more data analytics functions). The computing tasks performed by container A 302 and container B 304 may be the same or similar computing tasks happening in parallel, or different computing tasks happening in parallel. Container D 310, receives data from container A 302 and container B 304, and performs one or more computing tasks on the received data.

Meanwhile, container C 312 may receive data from a respective computing resource 314, perform one or more computing tasks on the received data, and transmit the resultant data to both container E 316 and container F 318. Container E 316 and container F 318 may perform one or more computing tasks on the data received from container C 312 and then transmit the resultant data to container I 320. As shown, container C 312, container E 316, container F 318, and container I 320 may be part of a container pod 322 running on a single compute surface or computing resource. In some embodiments, container C 312 may transmit the same data to container E 316 and container F 318 to perform the same computing tasks in parallel. However, in other embodiments, container E 316 and container F 318 may perform different computing tasks on the same data, such as applying different models to the same data set. In further embodiments, container E 316 and container F 318 may receive different data from container C 312 and perform different computing tasks on the received data. Container I 320 may perform additional computing tasks (e.g., for higher-level system related data processing) on the data received from container E 316 and container F 318 and then transmit the resultant data to a server 324.

As shown in FIG. 9, in some embodiments, container D 310 may periodically transmit data to container E 316, which may be in a different pod of containers or otherwise running on a different computing resource, for performance of one or more computing tasks. Container E 316 may perform the one or more computing tasks and transmit resultant data back to container D 310. Container D 310 may perform one or more computing tasks on data received from container A 302, container B 304, and/or container E 316 and transmit data to container H 326. If container A 302 and container B 304, and/or container E 316 perform the same or similar computing tasks in parallel, the computing tasks performed by container D 310 may include comparing the data received from container A 302, container B 304, and/or container E 316. However, if container A 302, container B 304, and/or container E 316 perform different computing tasks, then the computing tasks performed by container D 310 may include utilizing the data received from container A 302, container B 304, and/or container E 316, and/or combining the received data to perform some subsequent computing tasks. As shown, in some embodiments, container H 326 may periodically transmit data to container G 328, which may be in a different pod of containers or otherwise running on a different computing resource, for performance of one or more computing tasks. Container G 328 may perform the one or more computing tasks and transmit resultant data back to container H 326. Container H 326 may perform additional computing tasks on the data received from container D 310 and/or container G 328. Container H 326 may then transmit the resultant data to a dedicated computing system, such as the server 224, for storage, use, or analysis, etc.

In some embodiments, the data processing flow 300 of FIG. 9 may depict containers disposed in a hierarchy, or reflect a hierarchy of the underlying devices that execute the containers. Accordingly, in such an embodiment, data may flow up a hierarchy of devices and/or containers of the OT network (e.g., from left to right) such that a container receives data from containers and/or devices that are below it in the hierarchy and consolidates the received data before passing the consolidated data further up the hierarchy.

Accordingly, the set of computing tasks performed by the distributed computing resources shown in FIG. 9 may be distributed among a set of computing resources running on various devices. Accordingly, it should be understood that the computing resources shown in FIG. 9 may be running on any number of devices and/or compute surfaces. Accordingly, in some embodiments, the computing resources may be running on a single device, the computing resources may be distributed across multiple devices, or each of the computing resources may be running on its own compute surface or device.

As previously discussed, the chainable compute analytics functions performed by the distributed computing resources may be in response to an alert or a condition being detected within an industrial automation system. Accordingly, computing tasks performed by the distributed resources may be related to data acquisition, data processing/analysis, diagnosing conditions, identifying a cause of the alert/condition, identifying remedial actions, and so forth. Accordingly, in the data processing flows 200, 300 shown in FIGS. 8 and 9, computing resources may perform data acquisition related tasks, condition diagnosis and causal analysis related tasks, remedial action identification tasks. For example, one or more chainable compute analytics containers may be deployed after an alert is received to collect additional data, analyze collected data, and process or pre-process collected data. This may include, for example, generating signatures (e.g., motor signatures), identifying events, identifying anomalous data, filtering data, comparing collected data between devices or to historical data displaying known patterns, etc. Additional chainable compute analytics containers may be deployed to further analyze collected data to diagnose conditions and/or identify causes of alerts/conditions. This may include, for example, applying machine learning models, accessing historical data, accessing publicly available data, providing data to a service provider, comparing collected data to data collected from devices that display known patterns, and so forth. Further, chainable compute analytics containers may be deployed to identify and/or recommend remedial actions to address the diagnosed conditions. This may include, for example, applying machine learning models, accessing historical data, accessing publicly available data, referencing service data and/or product manuals, etc. Remedial actions may include, for example, changing operating parameters, replacing a part or component, performing a maintenance operation, restarting a device, updating software/firmware, scheduling service with a technician, etc. In some embodiments, remedial actions may be automatically implemented. In other embodiments, remedial actions may be presented to a user (e.g., for approval, to be performed manually, etc.).

In some embodiments, computing tasks performed by the chainable compute analytics containers may include running analytics to calculate one or more metrics, such as key performance indicators, throughput, downtime, etc. for a given device, a group of devices, an industrial automation system, a facility, a region, an enterprise, and so forth. In such embodiments, calculated metrics may be combined or otherwise used to populate a dashboard for review by a user. For example, one or more containers may be deployed to one or more compute surfaces and/or devices to collect or retrieve data from devices. The containers may then transmit the data to one or more chainable compute analytics containers that may apply filters or otherwise process the data, apply one or more algorithms, apply one of more models to the data and so forth. As described above, the containers may transmit data between one another to perform various analytics functions in parallel or one after the other. Further, some containers may be configured to receive data form multiple sources and aggregate the received data, compare the received data, and so forth. Correspondingly, some containers may be configured to perform one or more analytics functions on received data and provide the resultant data to multiple containers. In other embodiments, the computing tasks performed by the chainable compute analytics containers may include applying algorithms and/or machine learning models, such as classification models, root cause analysis models, data conversion models, filtering models, outlier removal models, linear regression models, and so forth. In further embodiments, chainable compute analytics containers may be used to train new machine learning models or retrain existing machine learning models.

In some embodiments, computing tasks performed by the chainable compute analytics containers may be used to identify and locate software and/or hardware components on an IT network or an OT network. This data may be used to populate and maintain records of software and/or hardware components on the IT network and/or OT network, and in some cases perform asset management. For example, containers may be deployed to probe a network and/or monitor network communications to identify hardware and/or software running on the network. In some cases, once a piece of hardware or software has been detected or otherwise found, the container may attempt to retrieve or request additional information out the hardware and/or software. Data pertaining to the hardware or software may be transmitted to one or more additional containers which may, for example, validate and/or verify the received data, and in some cases maintain records of hardware and/or software on the network. In other embodiments, chainable compute analytics containers may be used to implement a catalog service. For example, once a container identifies hardware or software on the OT network, the container may retrieve data (e.g., properties, configurations, specifications, user manuals, etc.) from outside resources, such as a cloud-based computing resource or database, a website, a remote server, etc. associated with the discovered hardware/software and store the retrieved data locally to be accessed and used.

In some embodiments, computing tasks performed by the chainable compute analytics containers may be used to identify what data is stored where, maintain records of where data is stored, and, in some case, generate maps of where data is stored. For example, a container may be deployed to probe nearby data stores (e.g., memories), identify data stored on the data store, and generate records (e.g., data maps, database tables, etc.) indicating where data is stored. In some embodiments, the generated records may be passed to other containers/devices to contribute to data storage records for an entire area, facility, region, enterprise, etc. Accordingly, a small namespace of known devices may be stored locally and referenced locally by authorized software/devices.

In some embodiments, computing tasks performed by the chainable compute analytics containers may be used to convert received data to from one communication protocol for a second communication protocol. For example, a chainable compute analytics container may receive data in a first communication protocol (e.g., FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean)), convert the data to a second communication protocol (e.g., a different communication protocol), and transmit the converted data back to the computing resource from which it was received, or to a different computing resource for further data processing.

In some embodiments, computing tasks performed by the chainable compute analytics containers may be used to encrypt and/or decrypt data. For example, in one embodiment, a chainable compute analytics container may receive encrypted data for processing. The chainable compute analytics container may then unencrypt the data and either save the unencrypted data for retrieval and processing by another chainable compute analytics container, or transmit the unencrypted data to another chainable compute analytics container for data processing. In some embodiments, the chainable compute analytics container may be configured to unencrypt received data using a first key and then reencrypt the received data using a second key for processing by one or more chainable compute analytics containers in one or more pods. The resultant data may then be unencrypted using the second key and reencrypted using the first key once data processing is completed and before the resultant data is transmitted back to the container. In other embodiments, unencrypted data may be received by the chainable compute analytics container and then encrypted by the chainable compute analytics container, either for processing, or for transmission back to the original source.

In some embodiments, computing tasks performed by the chainable compute analytics containers may be used to develop, provision, deploy, and/or enforce policies (e.g., security policies) within an IT and/or OT network. A policy is a set of one or more rules or procedures that govern access and use of an organization's OT assets (e.g., industrial automation hardware and/or software associated with OT machines). Characteristics of policies may include confidentiality, availability, integrity, authentication, operation, and non-repudiation of the organization's OT assets. A policy may include a set of two or more settings that identify data or information for components of the industrial automation system, or endpoints thereof, that are to be trusted, information regarding which communication ports to use, and the like. As such, a policy sets forth provisions that may govern management of OT assets, access to such assets, backups of such assets, security of such assets, operation of such assets, and the like. For example, a policy may define provisions addressing acceptable usage of OT/IT assets, antivirus management, data backup and disaster recovery, change management, cryptography usage, data and asset classification, data retention, data support and operations, data usage, email/messaging protection policies, user identity and access management, incident response, threat protection, internet usage restrictions, mobile device policy, OT/IT network security, password and credential protocols, firmware/patch management, personnel security, physical and environmental security, malware/spyware/ransomware detection, system update schedules, wireless network access, guest access, and so forth. Accordingly, a policy may govern, for example, how to manage who has access to what OT devices, what files and/or communications should be encrypted, what ports can be used for what purposes, characteristics of passwords (e.g., number of characters, upper and lower case letters, numbers, special characters), how often users must change their passwords, how often backups are done, how long backups are retained, guidelines for accessing wireless internet, what happens when a threat occurs, processes for onboarding/offboarding users as they start and leave positions, the process that occurs when a user changes roles, maintenance procedures, and so forth. Accordingly, one or more chainable compute analytics containers may be deployed to develop new policies based on detected activities within and/or vulnerabilities of an IT and/or OT network, or to suggest modifications to existing policies based on activities within and/or vulnerabilities of an IT and/or OT network. In further embodiments, chainable compute analytics containers may be used to provision and/or deploy policies within an IT and/or OT network. For example, chainable compute analytics containers may be deployed throughout a network to provide policies to devices within the IT and/or OT network and to provide guidance about implementing the policies within the IT and/or OT network. Further, chainable compute analytics containers may be deployed throughout the IT and/or OT network to enforce policies. This may include, for example, restricting access to the IT and/or OT network when policies are violated, flagging devices that violate policies, and so forth.

In some embodiments, computing tasks performed by the chainable compute analytics containers may be used to manage firmware within the IT and/or OT network. For example, one or more chainable compute analytics containers may be deployed throughout a network to identify what firmware a particular device is running, whether the firmware being run is current, identifying a current firmware version if the version being run is not current, downloading the current firmware version, and flashing, or otherwise installing, the current firmware version to the device.

In some embodiments, chainable compute analytics containers may be used to ascertain and/or monitor device health. For example, one or more chainable compute analytics containers may be deployed to or near a device in question. A first chainable compute analytics container may collect data from the device. The first chainable compute analytics container may or may not perform any data processing tasks on the collected data. The first chainable compute analytics container may then provide data to one or more second chainable compute analytics containers, which may be running in different pods and/or on different computing resources, for data processing, which may be used to determine the health/condition of the device. If maintenance or service is suggested, the chainable compute analytics containers may be configured to schedule or order maintenance or service.

In some embodiments, chainable compute analytics containers may be used to perform device calibration. For example, one or more chainable compute analytics containers may be deployed to or near a device to be calibrated. A first chainable compute analytics container may collect data from the device. The first chainable compute analytics container may or may not perform any data processing tasks on the collected data. The first chainable compute analytics container may then provide data to one or more second chainable compute analytics containers to determine whether the device is to be calibrated. One or more third chainable compute analytics containers may be deployed to the device itself to actually perform the calibration. In some embodiments, the first the second chainable compute analytics containers may be utilized to collect data from the calibrated device and analyze the collected data to confirm the calibration.

Though FIGS. 8 and 9 depict embodiments in which data is provided to a single container for data analytics/processing, or multiple containers distributed across multiple compute surfaces to perform data analytics/processing via chainable compute according to a distributed data processing flow, it should be understood that the embodiments shown and described with regard to FIG. 8 are merely examples and that embodiments having different combinations and configurations of containers, or other computing resources (e.g., edge devices, servers, desktop computers, laptop computers, tablets, mobile devices, human machine interfaces, industrial automation controllers, internet of things (IoT) devices, or any other devices having a processor), to perform data analytics/processing via chainable compute according to a distributed data processing flow are also envisaged. Accordingly, the scope of the claimed subject matter is not intended to be limited to the examples shown in FIGS. 8 and 9.

The presently disclosed techniques include chainable compute analytics containers. Specifically, a request to perform analytics operations may be received, or an alarm, an alert, a dataset, etc. may be received that triggers performance of analytics operations. A container orchestration system may identify data processing tasks included in the analytics operations, identify computing resources to perform the identified data processing tasks, and develop a distributed data processing flow for performing the analytics operations that assigns tasks to particular devices, as well as a sequence for the data processing tasks. The container orchestration system deploys one or more containers to the identified computing resources in accordance with the distributed data processing flow and transmits data to the containers for performance of the data processing tasks. In some embodiments, the containers may also be provided with the distributed data processing flow and/or instructions for what to do with resultant data when the container has completed the assigned data processing tasks. In some embodiments, the container may provide the resultant data back to the computing resource from which data was received. In other embodiments, the container may provide the resultant data, in some cases along with other data (e.g., the original data, the request for analytics operations, the distributed data processing flow, instructions for performing subsequent data processing tasks, etc.) to one or more additional containers or computing resources in the distributed data processing flow for additional processing. Accordingly, the containers and/or computing resources may be chained together across compute surfaces, container pods, computing devices, IT/OT networks, and so forth to perform the analytics operations. The analytics operations may include, for example, running analytics to calculate one or more metrics (e.g., key performance indicators), apply one or more algorithms, apply one or more machine learning models, identify software and/or hardware on the IT and/or OT networks, diagnose a condition causing the alert, identify the likely cause of the condition, and/or identify, and in some cases implement, one or more remedial actions to resolve the associated alert, identifying what data is stored where and, in some case, generating maps, convert data to different communication protocols, encrypting and/or decrypting data, provisioning and/or enforcing policies (e.g., security policies), managing firmware, discovering devices on the IT and/or OT network, determining device health, performing asset management, training machine learning models, performing device calibration, and so forth. In some embodiments, the data processing tasks may involve, for example, accessing a lookup table, accessing a database, using a decision tree, training and/or applying a machine learning or artificial intelligence (AI) model, analyzing historical data, and so forth. In some embodiments, once the analytics operations have been completed, some or all of the containers may be spun down. However, in other embodiments, one or more of the containers may continue to run (e.g., running additional analytics operations) after the analytics operations have been completed.

By using the disclosed techniques, available computing resources throughout the industrial automation system may be utilized to perform analytics operations, even if a single one of the devices in the industrial automation system does not have sufficient resources to perform the analytics operations locally. Accordingly, the disclosed techniques enable the analytics operations to be performed by an architecture of computing resources that would otherwise not have been able to perform the analytics operations without having to settle for performing only some of the data processing tasks, acquire additional computing resources to perform the data processing tasks, or repurpose existing computing resources to perform the data processing tasks. Accordingly, the disclosed techniques improve the efficiency of use of computing resources within the industrial automation system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A non-transitory computer readable medium storing instructions that, when executed by a processor, cause the processor to perform actions comprising:

- receiving (1) a request to perform one or more analytics operations, and (2) data associated with an industrial automation system, wherein the industrial automation system comprises a plurality of devices configured to perform a plurality of automation operations within the industrial automation system, and wherein each of the plurality of devices comprises a compute surface configured to perform one or more software tasks;
- receiving machine state data corresponding to the plurality of devices of the industrial automation system, wherein the machine state data includes a current operational state of each of the plurality of devices;
- determining that a portion of the plurality of devices are not operating in a desired state based on the machine state data;
- generating a command to cause the portion of the plurality of devices to operate at a desired state;
- determining a plurality of data processing tasks included in the one or more analytics operations;
- identifying a portion of the plurality of devices to perform the plurality of data processing tasks based on the compute surface available for each of the plurality of devices and based on each of the portion of the plurality of devices operating in the desired state;
- generating a distributed data processing flow, wherein the distributed data processing flow:
  - defines a sequence in which the plurality of data processing tasks are performed; and
  - assigns each of the plurality of data processing tasks to one or more of the portion of the plurality of devices;
- deploying a plurality of containers to each of the portion of the plurality of devices, wherein the plurality of containers comprises:

a first container configured to perform a first data processing task of the plurality of data processing tasks and transmit first resultant data to a second container; and the second container configured to receive the first resultant data from the first container, perform a second data processing task, and transmit second resultant data to the first container, wherein the first container is further configured to receive the second resultant data from the second container and perform a third data processing task.

2. The non-transitory computer readable medium of claim 1, wherein at least two of the containers deployed to the portion of the plurality of devices are configured to perform parallel data processing tasks.

3. The non-transitory computer readable medium of claim 2, wherein the parallel data processing tasks are the same.

4. The non-transitory computer readable medium of claim 2, wherein the parallel data processing tasks are different from one another.

5. The non-transitory computer readable medium of claim 1, wherein the first container is deployed to a first device of the portion of the plurality of devices, and wherein the second container is deployed to a second device of the portion of the plurality of devices.

6. The non-transitory computer readable medium of claim 5, wherein a first pod of containers, including the first container, runs on the first device, and wherein a second pod of containers, including the second container, runs on the second device.

7. The non-transitory computer readable medium of claim 1, wherein the first container is configured to transmit third resultant data to a third container, wherein the third container is configured to perform a fourth data processing task.

8. The non-transitory computer readable medium of claim 1, wherein deploying the plurality of containers to each of the portion of the plurality of devices comprises deploying a first pod of containers, wherein the first pod of containers comprises a first plurality of containers configured to coordinate to perform a first one or more of the plurality of data processing tasks.

9. The non-transitory computer readable medium of claim 8, wherein deploying the plurality of containers to each of the portion of the plurality of devices comprises deploying a second pod of containers, wherein the second pod of containers comprises a second plurality of containers configured to coordinate to perform a second one or more of the plurality of data processing tasks.

10. The non-transitory computer readable medium of claim 1, wherein the data associated with an industrial automation system comprises an alert generated by a device of the plurality of devices, and wherein the data processing tasks comprise diagnosing a condition causing the alert and one or more remedial actions to resolve the alert.

11. The non-transitory computer readable medium of claim 10, wherein the alert is indicative of the device of the plurality of devices ceasing to operate, the device of the plurality of devices ceasing to communicate, the device of the plurality of devices having machine state data falling outside a desired state range, or any combination thereof.

12. A method, comprising:

receiving (1) a request to perform one or more analytics operations, and (2) data associated with an industrial automation system, wherein the industrial automation system comprises a plurality of devices configured to perform a plurality of automation operations within the industrial automation system, and wherein each of the plurality of devices comprises a compute surface configured to perform one or more software tasks;

receiving machine state data corresponding to the plurality of devices of the industrial automation system, wherein the machine state data includes a current operational state of each of the plurality of devices;

determining that a portion of the plurality of devices are not operating in a desired state based on the machine state data;

generating a command to cause the portion of the plurality of devices to operate at a desired state;

determining a plurality of data processing tasks included in the one or more analytics operations and based on each of the portion of the plurality of devices operating at the desired state;

identifying a portion of the plurality of devices to perform the plurality of data processing tasks based on the compute surface available for each of the plurality of devices;

deploying a plurality of containers to each of the portion of the plurality of devices;

providing first instructions to a first container of the plurality of containers to perform a first data processing task of the plurality of data processing tasks and provide first resultant data from the first data processing task to a second container of the plurality of containers; and providing second instructions to the second container of the plurality of containers to perform a second data processing task of the plurality of data processing tasks upon receipt of the first resultant data, and transmit second resultant data to the first container, wherein the first container is further configured to receive the second resultant data from the second container and perform a third data processing task.

13. The method of claim 12, wherein the first container is deployed to a first device of the portion of the plurality of devices, and wherein the second container is deployed to a second device of the portion of the plurality of devices.

14. The method of claim 13, wherein a first pod of containers, including the first container, runs on the first device, and a second pod of containers, including the second container, runs on the second device.

15. A non-transitory computer readable medium storing instructions that, when executed by a processor, cause the processor to perform actions comprising:

receiving (1) a request to perform one or more analytics operations, and (2) data associated with an industrial automation system, wherein the industrial automation system comprises a plurality of devices configured to perform a plurality of automation operations within the industrial automation system, and wherein each of the plurality of devices comprises a compute surface configured to perform one or more software tasks;

receiving machine state data corresponding to the plurality of devices of the industrial automation system, wherein the machine state data includes a current operational state of each of the plurality of devices;

determining that a portion of the plurality of devices are not operating in a desired state based on the machine state data;

generating a command to cause the portion of the plurality of devices to operate at a desired state;

determining a plurality of data processing tasks included in the one or more analytics operations;

identifying a portion of the plurality of devices to perform the plurality of data processing tasks based on the compute surface available for each of the plurality of devices and based on each of the portion of the plurality of devices operating in the desired state;

deploying a plurality of containers to the portion of the plurality of devices;

providing first instructions to a first container of the plurality of containers to perform a first data processing task of the plurality of data processing tasks and provide first resultant data from the first data processing task to a second container of the plurality of containers; and providing second instructions to the second container of the plurality of containers to perform a second data processing task of the plurality of data processing tasks upon receipt of the first resultant data, and transmit second resultant data to the first container, wherein the first container is further configured to receive the second resultant data from the second container and perform a third data processing task.

16. The non-transitory computer readable medium of claim 15, wherein the one or more analytics operations comprise calculating one or more metrics based on the received data, applying one or more algorithms, applying one or more machine learning models, or training one or more machine learning models, or any combination thereof.

17. The non-transitory computer readable medium of claim 15, wherein the one or more analytics operations comprise identifying one or more pieces of software on an operational technology (OT) network, identifying one or more pieces of hardware on the OT network, performing one or more asset management operations, managing firmware on one or more of the plurality of devices, developing one or more policies for the OT network, deploying the one or more policies to the OT network, provisioning the one or more policies within the OT network, or enforcing the one or more policies within the OT network, or any combination thereof.

18. The non-transitory computer readable medium of claim 15, wherein the one or more analytics operations comprise diagnosing a condition of a particular device of the plurality of devices, identifying a cause of the condition of the particular device of the plurality of devices, identifying one or more remedial actions to address the condition of the particular device of the plurality of devices, determining a health of the particular device of the plurality of devices, or calibrating the particular device of the plurality of devices, or any combination thereof.

19. The non-transitory computer readable medium of claim 15, wherein the one or more analytics operations comprise identifying what data associated with the industrial automation system is stored on one or more of the plurality of devices, identifying where on the one or more of the plurality of devices the data associated with the industrial automation system is stored, or generating data maps for the data associated with the industrial automation system, or any combination thereof.

20. The non-transitory computer readable medium of claim 15, wherein the one or more analytics operations comprise converting the data from a first communication protocol to a second communication protocol, encrypting the data, or decrypting the data, or any combination thereof.

* * * * *